(12) United States Patent
Kitade et al.

(10) Patent No.: US 12,264,251 B2
(45) Date of Patent: Apr. 1, 2025

(54) INK, INK FOR INK-JET RECORDING, PRINTED MATTER, AND METHOD FOR PRODUCING PRINTED MATTER

(71) Applicant: DIC Corporation, Tokyo (JP)

(72) Inventors: Maiko Kitade, Kitaadachi-gun (JP); Yoshinosuke Shimamura, Kitaadachi-gun (JP); Masaki Hosaka, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 18/501,090

(22) Filed: Nov. 3, 2023

(65) Prior Publication Data

US 2024/0076514 A1    Mar. 7, 2024

Related U.S. Application Data

(62) Division of application No. 16/642,453, filed as application No. PCT/JP2018/033952 on Sep. 13, 2018, now abandoned.

(30) Foreign Application Priority Data

Sep. 26, 2017 (JP) .............................. JP2017-184812

(51) Int. Cl.
| | | |
|---|---|---|
| *C09D 11/38* | (2014.01) | |
| *B41J 2/01* | (2006.01) | |
| *C08K 5/053* | (2006.01) | |
| *C08K 5/17* | (2006.01) | |
| *C08K 5/25* | (2006.01) | |
| *C08L 33/08* | (2006.01) | |
| *C08L 33/26* | (2006.01) | |

(52) U.S. Cl.
CPC ............... *C09D 11/38* (2013.01); *B41J 2/01* (2013.01); *C08K 5/053* (2013.01); *C08K 5/17* (2013.01); *C08K 5/25* (2013.01); *C08L 33/08* (2013.01); *C08L 33/26* (2013.01); *C08L 2207/53* (2013.01)

(58) Field of Classification Search
CPC . C09D 11/38; B41J 2/01; C08K 5/053; C08K 5/17; C08K 5/25; C08L 33/08; C08L 33/26; C08L 2207/53
See application file for complete search history.

(56) References Cited

U.S. PATENT DOCUMENTS

| | | | |
|---|---|---|---|
| 2002/0147262 A1 | 10/2002 | Kriessmann et al. | |
| 2009/0021568 A1* | 1/2009 | Xu ........................ | C09D 11/328 347/96 |
| 2012/0262518 A1 | 10/2012 | Naruse et al. | |
| 2012/0313997 A1 | 12/2012 | Nakazawa et al. | |
| 2012/0315386 A1 | 12/2012 | Shu et al. | |
| 2014/0077486 A1 | 3/2014 | Naruse et al. | |
| 2015/0166803 A1 | 6/2015 | Jhaveri et al. | |
| 2016/0002456 A1 | 1/2016 | Sheerin et al. | |
| 2017/0002216 A1 | 1/2017 | Sato et al. | |
| 2017/0253838 A1 | 9/2017 | Scheibel et al. | |
| 2017/0267885 A1* | 9/2017 | Wakabayashi ............. | B41J 2/01 |
| 2020/0199390 A1* | 6/2020 | Kitade ................. | C09D 11/322 |

FOREIGN PATENT DOCUMENTS

| | | |
|---|---|---|
| CN | 103666110 A | 3/2014 |
| CN | 106752357 A | 5/2017 |
| JP | 57-3850 A | 1/1982 |
| JP | 7-26208 A | 1/1995 |
| JP | 10-45999 A | 2/1998 |
| JP | 11-343377 A | 12/1999 |
| JP | 2000-198856 A | 7/2000 |
| JP | 3112587 B2 | 11/2000 |
| JP | 2006-001974 A | 1/2006 |
| JP | 4136814 B2 | 8/2008 |
| JP | 2010280830 A * | 12/2010 |
| JP | 2011-148916 A | 8/2011 |
| JP | 2012-229411 A | 11/2012 |
| JP | 2012-255151 A | 12/2012 |
| JP | 2014-58589 A | 4/2014 |
| JP | 2014-205816 A | 10/2014 |
| JP | 2015-30799 A | 2/2015 |
| JP | 2015-30800 A | 2/2015 |
| JP | 2015-67667 A | 4/2015 |
| JP | 2015-521228 A | 7/2015 |
| JP | 2016-060885 A | 4/2016 |
| JP | 6149586 B2 | 6/2017 |
| KR | 10-2015-0020030 A | 2/2015 |

(Continued)

OTHER PUBLICATIONS

Machine translation of JP 2010280830 (Year: 2010).*
International Search Report dated Dec. 11, 2018, issued in counterpart application No. PCT/JP2018/039952 (3 pages).
Extended (Supplementary) European Search Report dated Apr. 30, 2021, issued in counterpart EP application No. 18861976.1. (8 pages).
Office Action dated Dec. 22, 2021, issued in counterpart CN application No. 201880050753.X, with English translation. (17 pages).
Non-Final Office Action dated Nov. 17, 2022, issued in U.S. Appl. No. 16/642,453.

(Continued)

*Primary Examiner* — Doris L Lee
(74) *Attorney, Agent, or Firm* — WHDA, LLP

(57) ABSTRACT

A task to be achieved by the present invention is to provide a method for producing a printed matter. The ink has excellent adhesion to an ink unabsorbent or non-absorbent recording medium, such as a resin film or coated paper, which is unlikely to absorb a solvent contained in an ink, and excellent setting property. The present invention is directed to a method for producing a printed matter, using an ink including a binder (A) having a carbonyl group, a compound (B) having a structure capable of reacting with the carbonyl group, and an aqueous medium in which the binder (A) and the compound (B) are dissolved or dispersed.

5 Claims, No Drawings

(56) References Cited

FOREIGN PATENT DOCUMENTS

WO         2015/111644 A1     7/2015
WO    WO-2016027801 A1 *  2/2016   ............... B41J 2/01

OTHER PUBLICATIONS

Final Office Action dated Mar. 3, 2023, issued in U.S. Appl. No. 16/642,453.
Final Office Action dated Aug. 15, 2023, issued in U.S. Appl. No. 16/642,453.

* cited by examiner

INK, INK FOR INK-JET RECORDING, PRINTED MATTER, AND METHOD FOR PRODUCING PRINTED MATTER

CROSS-REFERENCE TO RELATED APPLICATIONS

This application is a divisional of U.S. application Ser. No. 16/642,453, filed on Feb. 27, 2020, which is a 371 of International Application No. PCT/JP2018/033952, filed on Sep. 13, 2018, which is based upon and claims the benefit of priority from the prior Japanese Patent Application No. 2017-184812, filed on Sep. 26, 2017, the entire contents of which are incorporated herein by reference.

TECHNICAL FIELD

The present invention relates to an ink which can be used in producing a printed matter.

BACKGROUND ART

Ink-jet printers are widely used in printing on plain paper at home and in offices and the like.

On the other hand, in the industrial fields, studies are made on methods for printing on packaging materials and advertising media using an ink-jet printer. Examples of the packaging materials and advertising media include ink unabsorbent recording media formed from a resin film, such as an olefin resin film or a polyethylene terephthalate resin film, and non-absorbent recording media having a coating layer formed on the surface thereof, such as coated paper.

The ink unabsorbent or non-absorbent recording medium, however, absorbs almost no solvent contained in an ink, differing from the plain paper. Therefore, when a conventional ink which has been used in printing on plain paper is used in printing on an ink unabsorbent or non-absorbent recording medium, a problem is likely caused in that a clear image cannot be formed.

As an ink which can be used in printing on the ink unabsorbent or non-absorbent recording medium, and which can reduce the burden on the environment due to an organic solvent or the like, there has been known, for example, an aqueous ink-jet ink composition containing a pigment, an alkali-soluble resin, a wax emulsion, a basic compound, an aqueous medium, and a surfactant, wherein the wax in the wax emulsion has an average particle diameter of 150 to 200 nm, the content of solids of the wax emulsion in the aqueous ink-jet ink composition is 0.5 to 4% by mass, and the surfactant is an acetylenediol surfactant (see, for example, PTL 1).

However, the above-mentioned ink composition tends to be unsatisfactory in the adhesion to the ink unabsorbent or non-absorbent recording medium, especially the recording medium which is generally non-adherent, such as a polyolefin film or a polyethylene film, and therefore a problem in that the printed image is removed with the passage of time, or the like is likely caused.

Further, in the case of producing a printed matter by continuously printing an ink on the ink unabsorbent or non-absorbent recording medium, when the printed surface of the printed matter is in contact with the back surface of another printed matter, it is likely that the ink is transferred from the printed surface to the back surface, causing a problem in that the printed image is removed or the recording medium suffers breakage. The printed matter having such a problem is generally considered to have an unsatisfactory setting property, which is a fatal problem in the continuous production of the above-mentioned advertising media and the like.

Meanwhile, as a method for improving the adhesion of an ink to the ink unabsorbent or non-absorbent recording medium, there can be mentioned, for example, a method using an ink containing a resin having a low glass transition temperature.

However, when the ink containing a resin having a low glass transition temperature is used in an ink-jet printing ink, a disadvantage is likely to occur in that the discharge stability becomes poor.

CITATION LIST

Patent Literature

PTL 1: International Patent Publication No. 2015/111644 pamphlet

SUMMARY OF INVENTION

Technical Problem

A task to be achieved by the present invention is to provide an ink having excellent adhesion to an ink unabsorbent or non-absorbent recording medium, such as a resin film or coated paper, which is unlikely to absorb a solvent contained in an ink, and excellent setting property.

Further, a task to be achieved by the present invention is to provide an ink for ink-jet printing, having both excellent adhesion to an ink unabsorbent or non-absorbent recording medium, such as a resin film or coated paper, which is unlikely to absorb a solvent contained in an ink, and excellent setting property and discharge stability.

Solution to Problem

The present inventor has solved the above-mentioned problems by an ink and an ink for ink-jet printing, each including: a binder (A) having a carbonyl group; a compound (B) having a structure capable of reacting with the carbonyl group; and an aqueous medium (C) in which are the binder (A) and the compound (B) are dissolved or dispersed.

Advantageous Effects of Invention

The ink of the invention has excellent setting property and adhesion to an ink unabsorbent or non-absorbent recording medium, such as a resin film or coated paper, which is unlikely to absorb a solvent contained in an ink, and, when used in producing a printed matter by an ink-jet method, the ink can maintain excellent discharge stability for a long term without sacrificing excellent setting property and adhesion.

Further, the ink of the invention can form a crosslinked film even when dried in an environment at an ordinary temperature in the range of about 5 to 60° C., and therefore can be used in printing on a recording medium, such as a resin film, which likely suffers deformation or discoloration due to heat caused when the printed matter is dried.

DESCRIPTION OF EMBODIMENTS

The ink of the invention includes a binder (A) having a carbonyl group, a compound (B) having a structure capable of reacting with the carbonyl group, and an aqueous medium (C) in which the binder (A) and the compound (B) are dissolved or dispersed.

(Binder (A) Having a Carbonyl Group)

The binder (A) having a carbonyl group imparts excellent setting property and adhesion to the ink of the invention.

Specific examples of the carbonyl groups of the binder include an aldehyde group, a ketone group, an amide group, and a carboxyl group, and preferred is a ketone group.

With respect to the carbonyl group, the ink of the invention is printed on the surface of a recording medium and the solvent in the ink, for example, volatilizes, and then the carbonyl group is reacted with the functional group of the compound (B). As a result, the ink of the invention can exhibit excellent setting property and adhesion.

Examples of the binders (A) include acrylic polymers having an aldehyde group, acrylic polymers having a ketone group, acrylic polymers having an amide group, and acrylic polymers having a carboxyl group, and an acrylic polymer having a ketone group is preferably used in view of imparting further excellent adhesion to a recording medium, such as a polyolefin film or a polyethylene film, which is generally non-adherent.

Further, with respect to the binder (A), a so-called core-shell polymer can be used, and a polymer having the carbonyl group in one of or both of a core portion and a shell portion can be used.

With respect to the binder (A), among those mentioned above, a core-shell polymer having a carbonyl group, such as an amide group, in the core portion is preferably used in view of obtaining an ink having further excellent adhesion to the above-mentioned non-adherent recording medium and excellent discharge stability at a level that is required when the ink is discharged by an ink-jet method.

More specifically, with respect to the core-shell polymer, a core-shell acrylic polymer having a core portion comprising an acrylic polymer of a monomer component containing diacetone acrylamide, and a shell portion comprising an arbitrary acrylic polymer is preferably used in view of obtaining an ink having further excellent discharge stability at a level that is required when the ink is discharged by an ink-jet method.

The binder (A) can be produced by, for example, subjecting to polymerization a monomer component containing a monomer having the carbonyl group and, if necessary, other monomers.

With respect to the monomer having the carbonyl group, for example, diacetone acrylamide, 2-acetoacetoxyethyl methacrylate, or the like can be used, and diacetone acrylamide is preferably used in view of further improving the adhesion to the recording medium.

With respect to the other monomers, there can be used, for example, (meth) acrylic acid and alkali metal salts thereof, (meth) acrylate monomers, such as methyl (meth) acrylate, ethyl (meth) acrylate, butyl (meth) acrylate, 2-ethylhexyl (meth) acrylate, benzyl (meth) acrylate, and cyclohexyl (meth) acrylate, acrylic monomers having an amide group, such as acrylamide and N,N-dimethyl (meth) acrylamide, acrylic monomers, such as (meth) acrylonitrile, 2-dimethylaminoethyl (meth) acrylate, and glycidyl (meth) acrylate, aromatic vinyl compounds, such as styrene, α-methylstyrene, p-tert-butylstyrene, vinylnaphthalene, and vinylanthracene, vinylsulfonic acid compounds, such as vinylsulfonic acid and styrenesulfonic acid, vinylpyridine compounds, such as 2-vinylpyridine, 4-vinylpyridine, and naphthylvinylpyridine, and vinyltriethoxysilane, vinyltrimethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, and the like.

Examples of polymerization methods for the monomers include a solution polymerization method and an emulsion polymerization method, and an emulsion polymerization method is preferably employed.

The binder (A) having a glass transition temperature in the range of −12 to 25° C. is preferably used, and the binder (A) having a glass transition temperature in the range of 8 to 25° C. is especially preferably used in view of obtaining an ink having further excellent adhesion to the above-mentioned non-adherent recording medium and excellent discharge stability at a level that is required when the ink is discharged by an ink-jet method.

(Glass Transition Temperature)

The glass transition temperature (K) of the binder (A) is a theoretical calculated value determined, using the glass transition temperatures of respective homopolymers of the monomers constituting the binder (A), by the following FOX equation:

$$1/Tg = W1/Tg1 + W2/Tg2 + \ldots + Wn/Tgn$$

wherein Tg is a glass transition temperature (K) of a vinyl polymer, W1, W2, ..., and Wn are a weight fraction of each monomer, and Tg1, Tg2, ..., and Tgn are a glass transition temperature of a homopolymer of each monomer.

With respect to the glass transition temperatures of homopolymers used in the above calculation, the values described in "POLYMER HANDBOOK THIRD EDITION" (A WILEY-INTERSCIENCE PUBLICATION) were used.

The binder (A) is preferably used in an amount in the range of 1 to 10% by mass, based on the mass of the ink of the invention, and is especially preferably used in an amount in the range of 3 to 6% by mass in view of obtaining an ink having further excellent adhesion to the above-mentioned non-adherent recording medium.

(Compound (B) Having a Structure Capable of Reacting with the Carbonyl Group)

With respect to the compound (B), a compound having a structure capable of reacting with the carbonyl group of the binder (A) is used.

The ink of the invention is applied onto the surface of the above-mentioned recording medium, and a solvent, such as the aqueous medium (C) contained in the ink, volatilizes, and then the carbonyl group of the binder (A) and the above-mentioned structure of the compound (B) undergo dehydration and condensation or the like to cause crosslinking, so that the ink is fixed to the surface of the recording medium. As a result, a printed matter having excellent setting property and adhesion can be obtained.

Examples of the structures include a hydrazine structure and a hydrazino structure, and a hydrazine structure is preferred in view of obtaining an ink having excellent adhesion and setting property to the above-mentioned recording medium.

Specific examples of the compounds (B) include adipic dihydrazide, sebacic dihydrazide, dodecanedioic dihydrazide, isophthalic dihydrazide, and salicylic dihydrazide, and adipic dihydrazide is preferably used in view of obtaining an ink having excellent adhesion to the above-mentioned recording medium.

The compound (B) is preferably used in an amount in the range of 0.003 to 0.5% by mass, based on the mass of the ink of the invention, and is preferably used in an amount in the range of 0.01 to 0.5% by mass in view of obtaining an ink having further excellent adhesion to the recording medium.

Further, the compound (B) is preferably used in an amount in the range of 0.1 to 5% by mass, based on the mass of the binder (A), in view of obtaining an ink having adhesion to the recording medium.

The mass ratio [binder (A)/compound (B)] of the binder (A) having a carbonyl group and the compound (B) used is preferably in the range of 20/1 to 1,000/1, more preferably in the range of 100/1 to 500/1 in view of obtaining an ink having further excellent setting property.

(Aqueous Medium (C))

The ink of the invention uses a solvent containing an aqueous medium (C).

With respect to the aqueous medium (C), only water or a mixed solvent of water and the below-mentioned water-soluble organic solvent can be used.

With respect to the above-mentioned water, specifically, pure water, such as ion-exchanged water, ultrafiltered water, reverse-osmosed water, or distilled water, or ultrapure water can be used.

With respect to the water-soluble organic solvent, for example, ketones, such as acetone, methyl ethyl ketone, methyl butyl ketone, and methyl isobutyl ketone; alcohols, such as methanol, ethanol, 2-propanol, 2-methyl-1-propanol, 1-butanol, and 2-methoxyethanol; ethers, such as tetrahydrofuran, 1,4-dioxane, and 1,2-dimethoxyethane; glycols, such as dimethylformamide, N-methylpyrrolidone, ethylene glycol, diethylene glycol, triethylene glycol, tetraethylene glycol, propylene glycol, polyethylene glycol, and polypropylene glycol; diols, such as butanediol, pentanediol, hexanediol, and homologue diols thereof; glycol esters, such as propylene glycol laurate; glycol ethers, such as diethylene glycol monoethyl, diethylene glycol monobutyl ether, diethylene glycol monohexyl ether, propylene glycol ether, dipropylene glycol ether, and cellosolve including triethylene glycol ether; alcohols, such as methanol, ethanol, isopropyl alcohol, 1-propanol, 2-propanol, butyl alcohols, e.g., 1-butanol and 2-butanol, pentyl alcohol, and homologue alcohols thereof; sulfolane; lactones, such as γ-butyrolactone; and lactams, such as N-(2-hydroxyethyl)pyrrolidone, can be used individually or in combination.

Further, with respect to the water-soluble organic solvent other than those mentioned above, for improving the fast-drying property of the ink, a water-soluble organic solvent having a boiling point of 100 to 200° C. and a vapor pressure of 0.5 hPa or more at 20° C. can be used.

Examples of the water-soluble organic solvents having a boiling point and a vapor pressure in the above-mentioned respective ranges include 3-methoxy-1-butanol, 3-methyl-3-methoxy-1-butanol, 3-methoxy-3-methyl-1-butyl acetate, ethylene glycol monomethyl ether, ethylene glycol monoethyl ether, ethylene glycol monopropyl ether, ethylene glycol monobutyl ether, ethylene glycol monoisobutyl ether, ethylene glycol t-butyl ether, propylene glycol monomethyl ether, propylene glycol monoethyl ether, propylene glycol monopropyl ether, propylene glycol monomethyl ether acetate, diethylene glycol dimethyl ether, diethylene glycol methyl ethyl ether, diethylene glycol diethyl ether, dipropylene glycol dimethyl ether, 4-methoxy-4-methyl-2-pentanone, and ethyl lactate, and these can be used in combination.

Among the above-mentioned water-soluble organic solvents, in view of maintaining excellent dispersion stability of the ink and, for example, suppressing deterioration of the ink discharging nozzle of an ink-jet apparatus due to the solvent contained in the ink, a water-soluble organic solvent having an HSP (Hansen solubility parameter) in which the hydrogen bond term $\delta_H$ is in the range of 6 to 30 is preferably used.

With respect to the water-soluble organic solvent having an HSP in which the hydrogen bond term is in the above-mentioned range, specifically, preferred are 3-methoxy-1-butanol, 3-methyl-3-methoxy-1-butanol, ethylene glycol monomethyl ether, ethylene glycol monoethyl ether, ethylene glycol monopropyl ether, ethylene glycol monobutyl ether, ethylene glycol monoisobutyl ether, ethylene glycol t-butyl ether, propylene glycol monomethyl ether, propylene glycol monoethyl ether, and propylene glycol monopropyl ether, and more preferred are 3-methoxy-1-butanol and 3-methyl-3-methoxy-1-butanol.

With respect to the aqueous medium (C), for surely achieving excellent discharge stability of the ink of the invention being printed by an ink-jet printing method, as an organic solvent which is glycerol, diglycerol and/or a derivative thereof, there can be used glycerol, diglycerol, polyglycerol, a diglycerol fatty acid ester, a polyoxypropylene (n) polyglyceryl ether represented by the general formula (1), a polyoxyethylene (n)polyglyceryl ether represented by the general formula (2), or the like. Two or more members of these may be used in combination. In the invention, glycerol and a polyoxypropylene (n) polyglyceryl ether wherein n is 8 to 15 are especially preferably selected.

[Chem. 1]

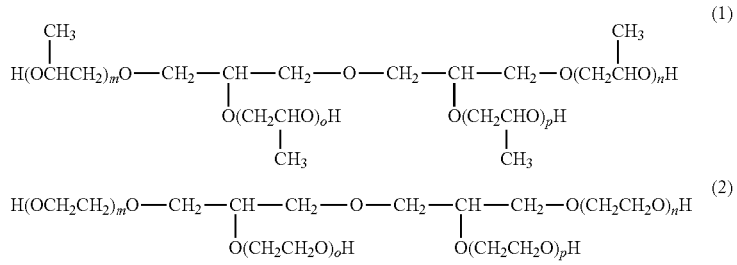

In the general formulae (1) and (2), each of m, n, o, and p independently represents an integer of 1 to 10.

(Solvent (C1))

With respect to the aqueous medium (C), among those mentioned above, a solvent (C1) having a Hansen solubility parameter in which the polar term is 7 or more and the hydrogen bond term is 15 or more is preferably used in view of achieving excellent discharge stability at a level that is required when the ink is discharged by an ink-jet method.

The solvent (C1) having a Hansen solubility parameter in which the polar term is preferably in the range of 7 to 15, more preferably 7 to 12, and the hydrogen bond term is preferably in the range of 15 to 30, more preferably 17 to 22 is preferably used in view of obtaining an ink having excellent discharge stability at a level that is required when the ink is discharged by an ink-jet method.

With respect to the solvent (C1), for example, one member of or a combination of two or more members of 1,2-propanediol, 1,2-hexanediol, 1,4-butanediol, 1,3-butanediol, 1,2-butanediol, 3-methyl-1,5-pentanediol, 2-methyl-1,3-propanediol, 3-methyl-1,3-butanediol, and 3-methyl-1,4-butanediol can be used. Of these, as the solvent (C1), a combination of 1,2-propanediol and at least one member selected from the group consisting of 1,2-hexanediol, 1,4-butanediol, 1,3-butanediol, 1,2-butanediol, 3-methyl-1,5-pentanediol, 2-methyl-1,3-propanediol, 3-methyl-1,3-butanediol, and 3-methyl-1,4-butanediol is more preferably used in view of reducing damage to the ink-jet head and improving the wettability of a recording medium with the ink, and consequently further improving the setting property and adhesion.

The solvent (C1) is preferably contained in an amount in the range of 15 to 40% by mass, based on the mass of the ink of the invention, and is preferably contained in an amount in the range of 15 to 25% by mass in view of achieving excellent discharge stability at a level that is required when the ink is discharged by an ink-jet method.

Further, the aqueous medium (C), such as the solvent (C1), is preferably used in an amount in the range of 15 to 50% by mass, based on the mass of the ink of the invention, and is more preferably used in an amount in the range of 15 to 30% by mass because the obtained ink has excellent setting property and excellent discharge property at a level that is required when the ink is discharged by an ink-jet method, and can be used in producing a clear printed matter.

(Colorant)

With respect to the ink of the invention, if necessary, the ink containing a colorant can be used.

With respect to the colorant, a pigment, a dye, or the like can be used. Especially, in view of producing a printed matter having excellent weathering resistance and the like, a pigment is preferably used.

With respect to the pigment, for example, an organic pigment or an inorganic pigment can be used.

Further, with respect to the pigment, a non-acid-treated pigment, an acid-treated pigment, or a pigment coated with a resin can be used.

With respect to the inorganic pigment, for example, iron oxide, carbon black produced by a method, such as a contact method, a furnace method, or a thermal method, or the like can be used.

With respect to the organic pigment, for example, an azo pigment (including an azo lake, an insoluble azo pigment, a condensed azo pigment, a chelate azo pigment, and the like), polycyclic pigments (e.g., a phthalocyanine pigment, a perylene pigment, a perynone pigment, an anthraquinone pigment, a quinacridone pigment, a dioxazine pigment, a thioindigo pigment, an isoindolinone pigment, and a quinophthalone pigment), lake pigments (e.g., a basic dye chelate and an acid dye chelate), a nitro pigment, a nitroso pigment, aniline black, or the like can be used.

Among the pigments, as carbon black usable in a black ink, there can be used No. 2300, No. 2200B, No. 900, No. 960, No. 980, No. 33, No. 40, No, 45, No. 45L, No. 52, HCF88, MA7, MA8, MA100, manufactured by Mitsubishi Chemical Corporation, Raven 5750, Raven 5250, Raven 5000, Raven 3500, Raven 1255, Raven 700, manufactured by Columbia Carbon Corporation, Regal 400R, Regal 330R, Regal 660R, Mogul L, Mogul 700, Monarch 800, Monarch 880, Monarch 900, Monarch 1000, Monarch 1100, Monarch 1300, Monarch 1400, manufactured by Cabot Specialty Chemicals Inc., Color Black FW1, Color Black FW2, Color Black FW2V, Color Black FW18, Color Black FW200, Color Black S150, Color Black 5160, Color Black 5170, Printex 35, Printex U, Printex V, Printex 1400U, Special Black 6, Special Black 5, Special Black 4, Special Black 4A, NIPEX 150, NIPEX 160, NIPEX 170, NIPEX 180, manufactured by Degussa AG, or the like.

Further, specific examples of pigments usable in a yellow ink include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, 185.

Further, specific examples of pigments usable in a magenta ink include C.I. Pigment Red 5, 7, 12, 48 (Ca), 48 (Mn), 57 (Ca), 57:1, 112, 122, 123, 146, 168, 176, 184, 185, 202, 209, 269, 282, and C.I. Pigment Violet 19.

Further, specific examples of pigments usable in a cyan ink include C.I. Pigment Blue 1, 2, 3, 15, 15:3, 15:4, 16, 22, 60, 63, 66.

Further, specific examples of pigments usable in a white ink include sulfates and carbonates of alkaline earth metals, silica, such as powder silicate and synthetic silicate, potassium silicate, alumina, alumina hydrate, titanium oxide, zinc oxide, talc, and clay. These may have been subjected to surface treatment.

For permitting the pigment to be stably present in the ink, it is preferred to employ means for advantageously dispersing the pigment in the aqueous medium (C).

As the means, for example, there can be mentioned:
(i) a method in which the pigment is dispersed, together with a pigment dispersant, in the aqueous medium (C) by the below-mentioned dispersing method; and
(ii) a method in which a self-dispersible pigment having a dispersibility imparting group (hydrophilic functional group and/or a salt thereof) bonded directly or indirectly through an alkyl group, an alkyl ether group, an aryl group, or the like to the surface of the pigment is dispersed and/or dissolved in the aqueous medium (C).

With respect to the self-dispersible pigment, there can be used one which is obtained by, for example, subjecting a pigment to physical treatment or chemical treatment to bond (graft) a dispersibility imparting group or an active species having a dispersibility imparting group onto the surface of the pigment. The self-dispersible pigment can be produced by, for example, a vacuum plasma treatment, an oxidation treatment using a hypohalous acid and/or a hypohalite, an oxidation treatment using ozone, a wet oxidation method in which the surface of the pigment is oxidized in water using an oxidizing agent, or a method in which p-aminobenzoic acid is bonded to the surface of the pigment so that a carboxyl group is bonded through a phenyl group.

The aqueous ink containing a self-dispersible pigment need not contain the pigment dispersant, and therefore is almost free from foaming or the like due to the pigment dispersant, and the ink having excellent discharge stability can be easily prepared. Further, the aqueous ink containing a self-dispersible pigment is easy to handle, and a marked increase in the viscosity is suppressed due to the pigment dispersant, and therefore can contain the pigment in a larger amount, and can be used in producing a printed matter having a high printing density.

With respect to the self-dispersible pigment, a commercially available product can be used, and examples of such commercially available products include Microjet CW-1 (trade name, manufactured by Orient Chemical Industries Co., Ltd.), and CAB-O-JET200 and CAB-O-JET300 (trade names, each of which is manufactured by Cabot Specialty Chemicals Inc.).

The colorant is preferably used in an amount in the range of 1 to 20% by mass, based on the mass of the ink, and is preferably used in an amount in the range of 2 to 10% by mass in view of further improving the dispersion stability of the colorant, such as the above-mentioned pigment, in the ink.

(Pigment Dispersant)

The pigment dispersant can be advantageously used when using a pigment as the colorant.

With respect to the pigment dispersant, for example, there can be used a polyvinyl alcohol, a polyvinylpyrrolidone, an acrylic resin, such as an acrylic acid-acrylate copolymer, a styrene-acrylic resin, such as a styrene-acrylic acid copolymer, a styrene-methacrylic acid copolymer, a styrene-methacrylic acid-acrylate copolymer, a styrene-α-methylstyrene-acrylic acid copolymer, or a styrene-α-methylstyrene-acrylic acid-acrylate copolymer, an aqueous resin, such as a styrene-maleic acid copolymer, a styrene-maleic anhydride copolymer, or a vinylnaphthalene-acrylic acid copolymer, or a salt of the aqueous resin. With respect to the pigment dispersant, AJISPER PB Series, manufactured by Ajinomoto Fine-Techno Co., Ltd., Disperbyk Series, manufactured by BYK Japan KK, EFKA Series, manufactured by BASF AG, SOLSPERSE Series, manufactured by Lubrizol Japan Limited, TEGO Series, manufactured by Evonik Industries AG, or the like can be used.

With respect to the pigment dispersant, a block polymer or a random polymer can be used. Further, with respect to the block polymer, a polymer produced by a living anionic polymerization method or a living radical method can be used. Specifically, a polymer represented by the general formula 1 is preferably used.

The polymer obtained by living anionic polymerization is specifically a polymer represented by the following general formula (3).

[Chem. 2]

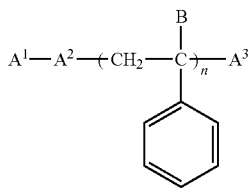

(3)

In the general formula (3), $A^1$ represents an organolithium initiator residue, $A^2$ represents a polymer block of a monomer having an aromatic ring or a heterocycle, $A^3$ represents a polymer block containing an anionic group, n represents an integer of 1 to 5, and B represents an aromatic group or an alkyl group.

In the general formula (3), $A^1$ represents an organolithium initiator residue. Specific examples of organolithium initiators include alkyllithiums, such as methyllithium, ethyllithium, propyllithium, butyllithium (such as n-butyllithium, sec-butyllithium, iso-butyllithium, and tert-butyllithium), pentyllithium, hexyllithium, methoxymethyllithium, and ethoxymethyllithium; phenylalkylenelithiums, such as benzyllithium, α-methylstyryllithium, 1,1-diphenyl-3-methylpentyllithium, 1,1-diphenylhexyllithium, and phenylethyllithium; alkenyllithiums, such as vinyllithium, allyllithium, propenyllithium, and butenyllithium; alkynyllithiums, such as ethynyllithium, butynyllithium, pentynyllithium, and hexynyllithium; aryllithiums, such as phenyllithium and naphthyllithium; heterocyclic lithiums, such as 2-thienyllithium, 4-pyridyllithium, and 2-quinolyllithium; and alkyllithium-magnesium complexes, such as tri(n-butyl)magnesium-lithium and trimethylmagnesium-lithium.

In the general formula (3) above, $A^2$ represents a polymer block having a hydrophobic group. $A^2$ is aimed for obtaining an appropriate solubility balance as mentioned above, and is preferably a group which is highly adsorptive to a pigment when brought into contact with the pigment, and $A^2$ is preferably a polymer block of a monomer having an aromatic ring or a heterocycle.

The polymer block of a monomer having an aromatic ring or a heterocycle is specifically a polymer block of a homopolymer or copolymer obtained by subjecting a monomer having an aromatic ring, such as a styrene monomer, or a monomer having a heterocycle, such as a vinylpyridine monomer, to homopolymerization or copolymerization.

Examples of monomers having an aromatic ring include styrene monomers, such as styrene, p-tert-butyldimethylsiloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, and p-methyl-α-methylstyrene, and vinylnaphthalene and vinylanthracene.

Further, with respect to the monomer having a heterocycle, for example, vinylpyridine monomers, such as 2-vinylpyridine and 4-vinylpyridine, can be used individually or in combination.

In the general formula (3) above, $A^3$ represents a polymer block containing an anionic group. $A^3$ is aimed for giving an appropriate solubility as mentioned above, and aimed for imparting dispersion stability in water to the pigment dispersion containing the polymer.

Examples of the anionic groups in the polymer block $A^3$ include a carboxyl group, a sulfonic acid group, and a phosphoric acid group. Of these, a carboxyl group is preferred from the viewpoint of easy preparation or easy availability from many types of monomers. Further, two carboxyl groups may form an acid anhydride group by having been dehydrated and condensed within the molecule or between the molecules.

With respect to the ink of the invention, there can be used the ink containing, in addition to the above-mentioned components, if necessary, an additional additive, such as a binder other than the binder having a carbonyl group, a humectant (dry preventing agent), a penetrant, an antiseptic agent, a viscosity modifier, a pH adjustor, a chelating agent, a plasticizer, an antioxidant, or an ultraviolet light absorber.

With respect to the other binders, for example, polyvinyl alcohol, gelatin, polyethylene oxide, polyvinylpyrrolidone, a polyolefin resin, an acrylic resin, a urethane resin, dextran, dextrin, carrageenan (κ, ι, λ and the like), agar, pullulan, water-soluble polyvinylbutyral, hydroxyethyl cellulose, and carboxymethyl cellulose can be used individually or in combination.

The humectant can be used for preventing the ink of the invention from being dried inside the ink discharge head. The humectant can be used preferably in an amount in the range of 0 to 10% by mass, more preferably 0 to 5% by mass, based on the mass of the ink of the invention.

With respect to the humectant, one which is highly miscible with water is preferably used for preventing the ink of the invention from being dried inside the ink discharge head, and examples of such humectants include ethylene glycol, diethylene glycol, triethylene glycol, polyethylene glycol having a molecular weight of 2,000 or less, dipropylene glycol, tripropylene glycol, mesoerythritol, pentaerythritol, urea, ethyleneurea, and 2-hydroxyethylurea.

Examples of the penetrants include lower alcohols, such as ethanol and isopropyl alcohol, ethylene oxide addition products of an alkyl alcohol, such as ethylene glycol hexyl ether and diethylene glycol butyl ether, and propylene oxide addition products of an alkyl alcohol, such as propylene glycol propyl ether. The penetrant can be used preferably in an amount in the range of 3% by mass or less, more preferably 1% by mass or less, based on the mass of the ink of the invention, and substantially no penetrant is especially preferably used.

The surfactant can be used for the purpose of reducing the surface tension of the ink of the invention to improve the ink in leveling.

With respect to the surfactant, there is no particular limitation, and examples include various types of anionic surfactants, nonionic surfactants, cationic surfactants, and amphoteric surfactants, and an anionic surfactant or a nonionic surfactant is preferably used.

With respect to the anionic surfactant, for example, an alkylbenzenesulfonic acid salt, an alkylphenylsulfonic acid salt, an alkylnaphthalenesulfonic acid salt, a higher fatty acid salt, a higher fatty acid ester sulfate salt, a higher fatty acid ester sulfonic acid salt, a higher alcohol ether sulfate salt or sulfonic acid salt, a higher alkylsulfosuccinic acid salt, a polyoxyethylene alkyl ether carboxylic acid salt, a polyoxyethylene alkyl ether sulfate, an alkylphosphoric acid salt, a polyoxyethylene alkyl ether phosphoric acid salt, or the like can be used. Specific examples of the anionic surfactants include dodecylbenzenesulfonic acid salts, isopropylnaphthalenesulfonic acid salts, monobutylphenylphenolmonosulfonic acid salts, monobutylbiphenylsulfonic acid salts, and dibutylphenylphenoldisulfonic acid salts.

With respect to the nonionic surfactant, for example, a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerol fatty acid ester, a polyoxyethylene glycerol fatty acid ester, a polyglycerol fatty acid ester, a sucrose fatty acid ester, a polyoxyethylene alkylamine, a polyoxyethylene fatty acid amide, a fatty acid alkylolamide, an alkylalkanolamide, acetylene glycol, an oxyethylene addition product of acetylene glycol, a polyethylene glycol-polypropylene glycol block copolymer, or the like can be used. With respect to the nonionic surfactant, polyoxyethylene nonyl phenyl ether, polyoxyethylene octyl phenyl ether, polyoxyethylene dodecyl phenyl ether, a polyoxyethylene alkyl ether, a polyoxyethylene fatty acid ester, a sorbitan fatty acid ester, a polyoxyethylene sorbitan fatty acid ester, a fatty acid alkylolamide, acetylene glycol, an oxyethylene addition product of acetylene glycol, or a polyethylene glycol-polypropylene glycol block copolymer is preferably used, and acetylene glycol or an oxyethylene addition product of acetylene glycol is more preferably used because the contact angle of the ink droplet to a recording medium is reduced, so that a printed matter being free of a white streak line, color omission or the like and having a satisfactory image density can be obtained.

With respect to the other surfactants, there can be used a silicone surfactant, such as a polysiloxane oxyethylene addition product; a fluorine surfactant, such as a perfluoroalkylcarboxylic acid salt, a perfluoroalkylsulfonic acid salt, or an oxyethylene perfluoroalkyl ether; a biosurfactant, such as spiculisporic acid, rhamnolipid, or lysolecithin, or the like.

The above-mentioned surfactants can be used individually or in combination. With respect to the surfactant, taking into consideration the dissolution stability in the aqueous medium (C) and the like, a surfactant having an HLB in the range of 7 to 20 is preferably used.

The surfactant is preferably used in an amount in the range of 0.001 to 2% by mass, more preferably in the range of 0.001 to 1.5% by mass, based on the mass of the ink of the invention, and is further preferably used in an amount in the range of 0.01 to 1% by mass in view of obtaining an ink which can produce a printed matter having further excellent setting property and adhesion.

(Method for Producing the Ink)

The ink of the invention can be produced by, for example, mixing a binder (A) having a carbonyl group, a compound (B) having a structure capable of reacting with the carbonyl group, an aqueous medium (C), and, if necessary, optional components including a solvent (C1) and a colorant.

In the mixing, a dispersing machine, such as a bead mill, an ultrasonic homogenizer, a high-pressure homogenizer, a paint shaker, a ball mill, a roll mill, a sand mill, a sand grinder, a Dyno-mill, a Dispermat, an SC mill, or a Nanomizer, can be used.

As a method for producing the ink, more specifically, there can be mentioned a method for producing the ink by mixing together the binder (A), the compound (B), the aqueous medium (C), and, if necessary, the optional components and stirring the resultant mixture, and the like.

Further, as another method for producing the ink, for example, there can be mentioned a method for producing the ink through <1> the step of mixing the pigment dispersant, a colorant, such as the pigment, and, if necessary, a solvent (C1) and the like to produce a colorant dispersion a containing the colorant at a high concentration, <2> the step of mixing the binder (A), the compound (B), and, if necessary, a solvent (C1) and the like to produce a composition b, <3> the step of producing a composition c containing the composition b and the aqueous medium (C) and the like, and <4> the step of mixing the colorant dispersion a and the composition c.

The ink obtained by the above-mentioned method is preferably subjected to centrifugal separation treatment or filtration treatment if necessary for removing impurities mixed into the ink.

(Physical Properties of the Ink)

The ink of the invention preferably has a viscosity at 32° C. of 2.0 mPa·s or more, more preferably 3.0 mPa·s or more, further preferably 5.0 mPa·s or more. Further, from the viewpoint of improving the storage stability and discharge property of the ink, the ink preferably has a viscosity at 32° C. of 20 mPa·s or less, more preferably 12 mPa·s or less, more preferably 9.0 mPa·s or less, further preferably 7.0 mPa·s or less. When the ink has a viscosity in the above-mentioned range, excellent discharge stability of the ink being discharged by, for example, an ink-jet method can be maintained.

In view of improving the storage stability and discharge property of the ink so as to suppress broadening of the dot diameter printed on an ink unabsorbent or non-absorbent recording medium and to improve the printing density and the adhesion to the recording medium, the ink of the invention preferably has a pH of 7.0 or more, more preferably 7.5 or more, further more preferably 8.0 or more. In view of suppressing deterioration of members constituting the apparatus for applying or discharging the ink (for example, an ink discharging nozzle and a flow path of the ink) and reducing the effect of the ink deposited on skin, the upper limit of the pH of the ink is preferably 11.0 or less, more preferably 10.5 or less, further more preferably 10.0 or less.

(Recording Medium)

The ink of the invention can be printed on a recording medium having excellent ink absorbing property, such as paper for indirect electrostatic process (PPC paper) generally used in a copying machine, a recording medium having an ink absorbing layer, an ink unabsorbent recording medium having no ink absorbing property, or an ink non-absorbent recording medium having a low ink absorbing property. Especially, even when the ink of the invention is printed on an ink unabsorbent or non-absorbent recording medium, a printed matter having excellent setting property and adhesion to the recording medium can be obtained.

With respect to the non-absorbent recording medium, the recording medium having a water absorption of 10 $g/m^2$ or less at a contact time of 100 milliseconds for the recording medium and pure water and the ink of the invention are preferably used in combination in view of obtaining a printed matter having further excellent adhesion to the recording medium.

With respect to the above-mentioned water absorption, using an automatic scanning liquid absorption meter (KM500win, manufactured by Kumagaya Riki Kogyo Co., Ltd.) under conditions at a relative humidity of 50% at 23° C., an amount of the pure water transferred is measured at a contact time of 100 ms to determine a water absorption for 100 milliseconds. The conditions for the measurement are shown below.

[Spiral Method]
Contact Time: 0.010 to 1.0 (sec)
Pitch: 7 (mm)
Length per sampling: 86.29 (degree)
Start Radius: 20 (mm)
End Radius: 60 (mm)
Min Contact Time: 10 (ms)
Max Contact Time: 1,000 (ms)
Sampling Pattern: 50
Number of sampling points: 19
[Square Head]
Slit Span: 1 (mm)
Width: 5 (mm)

Examples of ink absorbent recording media include plain paper, cloth, corrugated fiberboard, and wood. Examples of recording media having an ink absorbing layer include ink-jet paper, more specifically PICTORICO PRO photopaper of Pictorico Co., Ltd., and the like.

With respect to the ink non-absorbent recording medium having a low ink absorbing property, for example, running-on printing paper, such as art paper, coated paper, lightweight coated paper, and ultra lightweight coated paper, can be used. The ink non-absorbent recording medium is obtained by applying a coating material to the surface of wood free paper, alkaline paper or the like, which is formed mainly from cellulose and generally is not surface-treated, to form a coating layer on the surface, and examples include ultra lightweight coated paper, such as "OK Ever Light Coat", manufactured by Oji Paper Co., Ltd., and "Aurora S", manufactured by Nippon Paper Industries Co., Ltd., lightweight coated paper (A3), such as "OK Coat L", manufactured by Oji Paper Co., Ltd., and "Aurora L", manufactured by Nippon Paper Industries Co., Ltd., coated paper (A2, B2), such as "OK Top Coat Plus (basis weight: 104.7 $g/m^2$; water absorption at a contact time of 100 milliseconds (this applies to the following water absorption): 4.9 $g/m^2$)", manufactured by Oji Paper Co., Ltd., "Aurora Coat", manufactured by Nippon Paper Industries Co., Ltd., Finesse Gloss manufactured by UPM (manufactured by UPM; 115 $g/m^2$; water absorption: 3.1 $g/m^2$), and Finess Matt (115 $g/m^2$; water absorption: 4.4 $g/m^2$), and art paper (A1), such as "OK Kinfuji Plus", manufactured by Oji Paper Co., Ltd., and "Tokubishi Art", manufactured by Mitsubishi Paper Mills Limited.

With respect to the ink unabsorbent recording medium having no ink absorbing property, for example, a plastic film for use in packaging materials for food can be used.

Examples of the plastic films include polyester films, such as polyethylene terephthalate and polyethylene naphthalate, polyolefin films, such as polyethylene and polypropylene, polyamide films, such as nylon, a polystyrene film, a polyvinyl alcohol film, a polyvinyl chloride film, a polycarbonate film, a polyacrylonitrile film, and a polylactic acid film. Of these, as the plastic film, particularly, a polyester film, a polyolefin film, or a polyamide film is preferably used, and polyethylene terephthalate, polypropylene, or nylon is preferably used. The plastic film having gas barrier properties can also be used, and, for example, there can be used the above-mentioned plastic film having, on one surface or both surfaces thereof, a layer containing polyvinylidene chloride or the like, or a deposited layer containing a metal, such as aluminum, or a metal oxide, such as silica or alumina.

With respect to the plastic film, an unstretched film can be used, or a uniaxially or biaxially stretched film can be used. The plastic film having a surface which has been subjected to a treatment for improving the adhesion, such as a corona discharge treatment, an ozone treatment, a low-temperature plasma treatment, a flame treatment, or a glow discharge treatment, is preferably used.

The plastic film having an arbitrary thickness according to the application can be used, and, for example, when used in the soft package application, in view of maintaining excellent flexibility, durability, and curling resistance, the plastic film having a thickness of 10 to 100 μm is preferably used, and the plastic film having a thickness of 10 to 30 μm is more preferably used. Examples of the plastic films include PYLEN and ESPET (both are registered trademarks), manufactured by Toyobo Co., Ltd.

The ink of the invention can be used in producing a printed matter by printing the ink on the surface of the above-mentioned recording medium.

The ink can be applied to, for example, an ink-jet method, a screen printing method, a flexographic printing method, or a gravure printing method, and can be preferably used as an ink for ink-jet printing.

As an example of a printed matter using the ink, there can be mentioned a printed matter which is obtained by bringing the ink in contact with the surface of a recording medium by the ink-jet method or the like, and then drying the ink to cause the carbonyl group of the binder (A) and the hydrazine structure of the compound (B) contained in the ink to be reacted with each other, forming a structure represented by the chemical formula (1) below.

The drying is preferably conducted so that the surface temperature of the recording medium is in the range of 25 to 60° C. because even when a recording medium having a relatively low resistance to heat is used, the recording medium can be prevented from suffering deformation or discoloration due to heat.

[Chem. 3]

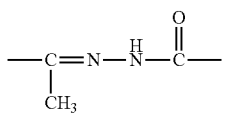
(1)

The structure represented by the chemical formula (1) above is specifically a structure formed when the carbonyl group of the binder (A) is a ketone group and the structure of the compound (B) is a hydrazine structure. By virtue of the above structure formed in the film of the printed matter, excellent adhesion and setting property to the above-mentioned non-adherent recording medium can be exhibited.

By the way, in the case of printing the ink of the invention on the above-mentioned recording medium by the ink-jet printing method, when the surface of the recording medium has an uneven form, or when the recording medium is large in size and has strain or warpage, there is concern that the ink-jet head and the recording medium are in contact. As a method for avoiding the contact, preferred is the use of an ink-jet recording apparatus having a construction in which the gap between a plane (x) having an ink outlet of an ink-jet head and a position (y) of an intersection of the perpendicular line to the plane (x) and the recording medium is preferably 1 mm or more, more preferably 2 mm or more, further preferably 3 mm or more.

With respect to the gap between the plane (x) and the position (y) of an intersection of the virtual line perpendicular to the plane (x) and the recording medium, the lower limit of the gap is preferably 3 mm or more, and the upper limit of the gap is preferably 10 mm or less, especially preferably 5 mm or less, for preventing the surface of the recording medium and the ink outlet from being in contact to effectively prevent an ink discharge failure caused due to damage of the ink outlet or deterioration of the water repellency function that the ink outlet generally has even when the recording medium is large and likely to suffer warpage, and for producing a printed matter having no streak line even when the gap between the surface of the recording medium and the ink-jet head is large.

Therefore, with respect to the method for producing a printed matter, which uses the ink of the invention and avoids the contact of the ink-jet head and a recording medium, specifically, preferred is a method for producing a printed matter, which comprises bringing the ink for ink-jet printing of the invention in contact with the surface of a recording medium by an ink-jet recording method in which the gap between a plane (x) having an ink outlet of an ink-jet head and a position (y) of an intersection of the perpendicular line to the plane (x) and the recording medium is set at 1 mm or more, and then drying the ink while maintaining the surface temperature of the recording medium in the range of 5 to 60° C. to cause the carbonyl group of the binder (A) and the hydrazine structure of the compound (B) contained in the ink to be reacted with each other, forming a structure represented by the following chemical formula (1):

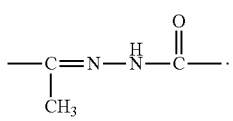
(1)

EXAMPLES

Hereinbelow, the present invention will be described in more detail with reference to the following Examples.

(Styrene-(Meth)Acrylic Acid Copolymer)

1,200 Parts by mass of isopropyl alcohol (IPA) was charged into a reaction vessel of an automatic polymerization reaction apparatus (polymerization testing machine Model DSL-2AS, manufactured by Todoroki Co.) having a reaction vessel equipped with a stirrer, a dropping apparatus, a temperature sensor, and a reflux apparatus having a nitrogen gas introducing apparatus at the upper portion, and, while stirring, the inside of the reaction vessel was purged with nitrogen gas.

While maintaining the nitrogen gas atmosphere inside the reaction vessel, the temperature was increased to 80° C., and then a mixture of 75.0 parts by mass of 2-hydroxyethyl methacrylate, 260.8 parts by mass of methacrylic acid, 400.0 parts by mass of styrene, 234.2 parts by mass of benzyl methacrylate, 30.0 parts by mass of glycidyl methacrylate, and 80.0 parts by mass of "PERBUTYL (registered trademark) O" (manufactured by NOF Corporation; effective component: t-butyl peroxy-2-ethylhexanoate) was added dropwise by means of the dropping apparatus over 4 hours. After completion of the addition, the reaction was further conducted at the same temperature for 15 hours, and then a part of IPA was distilled off under a reduced pressure so as to adjust the solids content to 42.5% by mass, obtaining a styrene-(meth)acrylic acid copolymer (X) solution having an acid value of 170 mg KOH/g.

(Preparation of a Pigment Dispersion)

Into a mixing tank having a cooling jacket was charged 360 parts by mass of carbon black (C.I. Pigment Black 7, manufactured by Mitsubishi Chemical Corporation), 170 parts by mass of the styrene-(meth) acrylic acid copolymer (X) solution, 61 parts by mass of a 25% by mass aqueous solution of potassium hydroxide, 83 parts by mass of isopropyl alcohol, and 1,000 parts by mass of ion-exchanged water, and the resultant mixture was stirred using a three-one motor for one hour.

The mixture was passed through a dispersing apparatus (SC Mill Model SC100/32, manufactured by Mitsui Kozan Kabushiki Gaisha) filled with zirconia beads having a diameter of 0.3 mm, and subjected to dispersing treatment in a circulation system (which is a system in which the mixture discharged from the dispersing apparatus is returned to the mixing tank and is fed again to the dispersing apparatus) to obtain a dispersion. The dispersing treatment was performed for 4 hours at a rotor circumferential velocity of the dispersing apparatus fixed to 11.25 m/second. Further, during the dispersing treatment, the temperature of the mixture was controlled to be maintained at 30° C. or lower by passing cooling water through the cooling jacket.

The dispersion obtained by the above-mentioned method was withdrawn from the mixing tank. Then, 1,500 parts by mass of water was fed to the mixing tank to clean the mixing tank and the flow path of the dispersing apparatus, and the water used in the cleaning and the withdrawn dispersion were mixed together to obtain a mill dispersion.

Then, the mill dispersion was placed in a distillation apparatus made of glass, and all of the isopropyl alcohol and part of the water contained in the mill dispersion were distilled off. After distilling them off, the resultant mill dispersion was allowed to stand and cooled to room temperature, and then, while stirring the dispersion, 2% by mass hydrochloric acid was added dropwise to the dispersion to adjust the pH to 3.5, and the solid material contained in the dispersion was taken by filtration using a Nutsche type filtration apparatus and washed with water to obtain a wet cake.

The wet cake was placed in a container, and a 25% by mass aqueous solution of potassium hydroxide was added to the wet cake so as to adjust the pH to 9.0, and the resultant mixture was re-dispersed using a Disper (TK Homogenizing Disper Model 20, manufactured by Tokushu Kika Kogyo Co., Ltd.) and subjected to centrifugal separation treatment (at 6,000G for 30 minutes), and then ion-exchanged water was added to obtain an aqueous pigment dispersion (K) having a solids content of 18% by mass.

(Preparation of an Aqueous Ink)

Example 1

Method for Preparing an Aqueous Ink

To 40 parts by mass of the aqueous pigment dispersion (K) were added 17.14 parts by mass of a composition A (mixture of a binder which is a core-shell acrylic polymer having a diacetone acrylamide-derived structure (having a ketone group as a carbonyl group) in the core portion, and adipic dihydrazide; non-volatile content: 42% by mass; volume average particle diameter of the core-shell acrylic polymer: 50 nm; glass transition temperature of the core-shell acrylic polymer: −12° C.), 20 parts by mass of PG (propylene glycol, manufactured by Asahi Glass Co., Ltd.), 21.56 parts by mass of ion-exchanged water, 0.20 parts by mass of triethanolamine, 0.10 parts by mass of ACTICIDE MV4 (antiseptic agent, manufactured by Thor Japan Co., Ltd.), and 1 part by mass of SURFYNOL 440 (acetylene dialcohol surfactant, manufactured by Evonik Industries AG), and the resultant mixture was stirred to obtain a black aqueous ink (J1).

Examples 2 to 20 and Comparative Examples 1 to 5

Method for Preparing an Aqueous Ink

Aqueous inks (J2) to (J20) and aqueous inks (H1) to (H5) were individually obtained by substantially the same method as in Example 1 except that the formulation of the ink was changed to the formulation shown in Tables 1 to 5.

TABLE 1

|  |  | Example 1 (J1) | Example 2 (J2) | Example 3 (J3) | Example 4 (J4) | Example 5 (J5) |
|---|---|---|---|---|---|---|
| Pigment dispersion [Parts by mass] | Aqueous pigment dispersion (K) | 40 | 40 | 40 | 40 | 40 |
| Solvent and others [Parts by mass] | PG | 20 | 20 | 20 | 20 | 20 |
|  | TEA | 0.20 | 0.20 | 0.20 | 0.20 | 0.20 |
|  | MV4 | 0.10 | 0.10 | 0.10 | 0.10 | 0.10 |
|  | SF440 | 1.0 | 1.0 | 1.0 | 1.0 | 1.0 |
|  | Ion-exchanged water | 21.56 | 22.48 | 26.20 | 30.13 | 32.45 |
| Composition [Parts by mass] | Composition A | 17.14 |  |  | 8.57 |  |
|  | Composition B |  | 16.22 |  |  |  |
|  | Composition C |  |  | 12.50 |  | 6.25 |

TABLE 2

|  |  | Example 6 (J6) | Example 7 (J7) | Example 8 (J8) | Example 9 (J9) | Example 10 (J10) |
|---|---|---|---|---|---|---|
| Pigment dispersion [Parts by mass] | Aqueous pigment dispersion (K) | 40 | 40 | 40 | 40 | 40 |
| Solvent and others [Parts by mass] | PG | 10 | 10 | 20 | 20 | 15 |
|  | 3MB | 10 |  |  |  |  |
|  | TEG |  | 10 |  |  |  |
|  | TEA | 0.20 | 0.20 | 0.20 | 0.20 | 0.20 |
|  | MV4 | 0.10 | 0.10 | 0.10 | 0.10 | 0.10 |
|  | SF440 | 1.00 | 1.00 | 1.00 | 1.00 | 1.00 |
|  | Ion-exchanged water | 26.20 | 26.20 | 25.39 | 25.93 | 31.20 |
| Composition [Parts by mass] | Composition A |  |  |  |  |  |
|  | Composition B |  |  |  |  |  |
|  | Composition C | 12.50 | 12.50 | 6.25 | 6.25 | 12.50 |
|  | Composition D |  |  | 7.06 |  |  |
|  | Composition E |  |  |  | 6.52 |  |

TABLE 3

|  |  | Example 11 (J11) | Example 12 (J12) | Example 13 (J13) | Example 14 (J14) | Example 15 (J15) |
|---|---|---|---|---|---|---|
| Pigment dispersion [Parts by mass] | Aqueous pigment dispersion (K) | 40 | 40 | 40 | 40 | 40 |
| Solvent and others [Parts by mass] | PG | 10 | 10 | 10 | 10 | 10 |
|  | 1,2-HG | 10 |  |  |  |  |
|  | 1,3-BG |  | 10 |  |  |  |
|  | 1,4-BG |  |  | 10 |  |  |
|  | MPD |  |  |  | 10 |  |
|  | 3MG |  |  |  |  | 10 |
|  | TEA | 0.20 | 0.20 | 0.20 | 0.20 | 0.20 |
|  | MV4 | 0.10 | 0.10 | 0.10 | 0.10 | 0.10 |
|  | SF440 | 1.00 | 1.00 | 1.00 | 1.00 | 1.00 |
|  | Ion-exchanged water | 26.20 | 26.20 | 26.20 | 26.20 | 26.20 |
| Composition [Parts by mass] | Composition A |  |  |  |  |  |
|  | Composition B |  |  |  |  |  |
|  | Composition C | 12.50 | 12.50 | 12.50 | 12.50 | 12.50 |

TABLE 4

|  |  | Example 16 (J16) | Example 17 (J17) | Example 18 (J18) | Example 19 (J19) | Example 20 (J20) |
|---|---|---|---|---|---|---|
| Pigment dispersion [Parts by mass] | Aqueous pigment dispersion (K) | 40 | 40 | 40 | 40 | 40 |
| Solvent and others [Parts by mass] | PG |  |  |  |  |  |
|  | 1,2-HG | 20 |  |  |  |  |
|  | 1,3-BG |  | 20 |  |  |  |
|  | 1,4-BG |  |  | 20 |  |  |
|  | MPD |  |  |  | 20 |  |
|  | 3MG |  |  |  |  | 20 |
|  | TEA | 0.20 | 0.20 | 0.20 | 0.20 | 0.20 |
|  | MV4 | 0.10 | 0.10 | 0.10 | 0.10 | 0.10 |
|  | SF440 | 1.00 | 1.00 | 1.00 | 1.00 | 1.00 |
|  | Ion-exchanged water | 26.20 | 26.20 | 26.20 | 26.20 | 26.20 |
| Composition [Parts by mass] | Composition A |  |  |  |  |  |
|  | Composition B |  |  |  |  |  |
|  | Composition C | 12.50 | 12.50 | 12.50 | 12.50 | 12.50 |

TABLE 5

|  |  | Comparative Example 1 (H1) | Comparative Example 2 (H2) | Comparative Example 3 (H3) | Comparative Example 4 (H4) | Comparative Example 5 (H5) |
|---|---|---|---|---|---|---|
| Pigment dispersion [Parts by mass] | Aqueous pigment dispersion (K) | 40 | 40 | 40 | 40 | 40 |
| Solvent and others [Parts by mass] | PG | 10 | 10 | 10 |  |  |
|  | MB | 10 | 10 | 10 | 20 |  |
|  | TEG |  |  |  |  | 20 |
|  | TEA | 0.20 | 0.20 | 0.20 | 0.20 | 0.20 |
|  | MV4 | 0.10 | 0.10 | 0.10 | 0.10 | 0.10 |
|  | SF440 | 1.00 | 1.00 | 1.00 | 1.00 | 1.00 |
|  | Ion-exchanged water | 24.75 | 25.66 | 21.56 | 26.20 | 26.20 |
| Composition [Parts by mass] | Composition D | 13.95 |  |  | 12.50 | 12.50 |
|  | Composition E |  | 13.04 |  |  |  |
|  | Composition F |  |  | 17.14 |  |  |

The abbreviations shown in the tables are as described below.

Composition A: Mixture of a binder which is a core-shell acrylic polymer having a diacetone acrylamide-derived structure (having a ketone group as a carbonyl group) in the core portion, and adipic dihydrazide; non-volatile content: 42% by mass; volume average particle diameter of the core-shell acrylic polymer: 50 nm; glass transition temperature of the core-shell acrylic polymer: −12° C.

Composition B: Mixture of a binder which is a core-shell acrylic polymer having a diacetone acrylamide-derived structure (having a ketone group as a carbonyl group) in the core portion, and adipic dihydrazide; non-volatile content: 37% by mass; volume average particle diameter of the core-shell acrylic polymer: 50 nm; glass transition temperature of the core-shell acrylic polymer: 8° C.

Composition C: Mixture of a binder which is a core-shell acrylic polymer having a diacetone acrylamide-derived structure (having a ketone group as a carbonyl group) in the core portion, and adipic dihydrazide; non-volatile content: 48% by mass; volume average particle diameter of the core-shell acrylic polymer: 50 nm; glass transition temperature of the core-shell acrylic polymer: 25° C.

Composition D: Water dispersion of an acrylic polymer binder, which does not contain adipic dihydrazide corresponding to the compound (B); non-volatile content: 43% by mass; Tg: −24° C.

Composition E: Water dispersion of an acrylic polymer binder, which does not contain adipic dihydrazide corresponding to the compound (B); non-volatile content: 46% by mass; volume average particle diameter: 70 nm; Tg: 15° C.

Composition F: Urethane dispersion which does not contain adipic dihydrazide corresponding to the compound (B); non-volatile content: 35% by mass

TABLE 6

| Abbreviation | Name | Boiling point (° C.) | Hansen solubility parameter Polar term | Hansen solubility parameter Hydrogen bond term |
|---|---|---|---|---|
| PG | 1,2-Propanediol | 185 | 10.4 | 21.3 |
| 1,2-HG | 1,2-Hexanediol | 250 | 7.1 | 17.5 |
| 1,3-BG | 1,3-Butanediol | 208 | 8.1 | 20.9 |
| 1,4-BG | 1,4-Butanediol | 228 | 11.0 | 20.9 |
| MPD | 3-Methyl-1,5-pentanediol | 250 | 8.0 | 17.4 |
| 3MG | 2-Methyl-1,3-propanediol | 231 | 9.6 | 21.2 |
| 3MB | 3-Methoxy-1-butanol | 161 | 5.4 | 13.6 |
| TEG | Triethylene glycol | 287 | 12.5 | 18.6 |

TEA: Triethanolamine

MV4: Antiseptic agent ACTICIDE MV4, manufactured by Thor Japan Co., Ltd.

SF440: SURFYNOL 440, manufactured by Evonik Industries AG

Water: Ion-exchanged water (Evaluation of an Aqueous Ink)

Evaluation for the properties of the aqueous inks (J1) to (J20) and (H1) to (H5) was conducted as described below. The results are shown in Tables 5 to 7.

[Evaluation for Setting Property]

Ink-jet head KJ4B-YH, manufactured by Kyocera Corporation, was filled with each of the aqueous inks obtained in the Examples and Comparative Examples, and, using an ink-jet printer in which the heat difference of an ink subtank from the head nozzle plate surface was set at +35 cm and the negative pressure was set at −5.0 kPa, a 100% density solid image was printed on the corona treated surface of an OPP film (PYLEN P2161, manufactured by Toyobo Co., Ltd.; biaxially stretched polypropylene film) and a PET film (ESPET E5102, manufactured by Toyobo Co., Ltd.; biaxially stretched polyester film), and dried using a hot-air dryer at 60° C. for one minute to obtain a printed matter.

The gap between the ink-jet head and the OPP film and PET film was set at 1.2 mm. Driving conditions for the head were such that the standard voltage and standard temperature of the ink-jet head were employed, and the ink droplet size was set at 18 pL.

The printed matter was removed from the hot-air dryer and allowed to stand at room temperature for one minute, and then the corona untreated surface of another OPP film was stacked on the printed surface of the printed matter, and a weight was placed on the film so that the load became 100 g/cm², and the resultant printed matter was allowed to stand for one minute.

After one minute had lapsed, the weight was removed, and the OPP film stacked on the printed matter was peeled off and then, the printed surface of the printed matter was scanned by a scanner, and analyzed using an image analysis soft "ImageJ" to determine a ratio (color residual ratio) of the image density after peeling the OPP film to the 100% density image before stacking the OPP film as a reference.

⊙: The color residual ratio of the printed matter is 90% or more.

◯: The color residual ratio of the printed matter is 70 to less than 90%.

x: The color residual ratio of the printed matter is less than 70%.

[Evaluation for Adhesion]

Ink-jet head KJ4B-YH, manufactured by Kyocera Corporation, was filled with each of the aqueous inks obtained in the Examples and Comparative Examples, and, using an ink-jet printer in which the heat difference of an ink subtank from the head nozzle plate surface was set at +35 cm and the negative pressure was set at −5.0 kPa, a 100% density solid image was printed on the corona treated surface of an OPP film (PYLEN P2161, manufactured by Toyobo Co., Ltd.; biaxially stretched polypropylene film) and a PET film (ESPET E5102, manufactured by Toyobo Co., Ltd.; biaxially stretched polyester film), and dried using a hot-air dryer at 60° C. for 5 minutes to obtain a printed matter.

The gap between the ink-jet head and the OPP film and PET film was set at 1.2 mm. Driving conditions for the head were such that the standard voltage and standard temperature of the ink-jet head were employed, and the ink droplet size was set at 18 pL.

Then, a cellophane adhesive tape was strongly pressed onto the printed surface of the printed matter, and then the cellophane adhesive tape was pulled in the direction at 90° to the printed surface.

The printed surface (x) obtained after peeling the cellophane adhesive tape off and the printed surface (y) before applying the cellophane adhesive tape were scanned by a scanner, and analyzed using an image analysis soft "ImageJ" to determine a ratio (color residual ratio) of the color of the printed surface (y) to the color of the printed surface (x).

⊙: The color residual ratio is 70% or more.

◯: The color residual ratio is 50 to less than 70%.

x: The color residual ratio is less than 50%.

[Ink-Jet Discharge Property]

Ink-jet head KJ4B-YH, manufactured by Kyocera Corporation, was filled with each of the aqueous inks obtained in the Examples and Comparative Examples, and the feed pressure was controlled by setting the heat difference of an ink subtank from the head nozzle plate surface at +35 cm and the negative pressure at −5.0 kPa. Driving conditions for the head were such that the standard voltage and standard temperature of the ink-jet head were employed, and the droplet size was set at 18 pL, and 100 droplets were discharged at 20 kHz and the state of the flying ink droplets was observed using a stroboscope.

⊙: The ink droplets can be continuously discharged straight.

◯: The ink droplets sometimes do not fly straight, but can be continuously discharged.

x: The ink droplets do not fly straight or cannot be discharged.

[Evaluation for Streak Line of a Printed Matter]

Ink-jet head KJ4B-YH, manufactured by Kyocera Corporation, was filled with each of the aqueous inks obtained in the Examples and Comparative Examples, and the feed pressure was controlled by setting the heat difference of an ink subtank from the head nozzle plate surface at +35 cm and the negative pressure at −5.0 kPa. Further, the gap between a plane (x) having an ink outlet of the ink-jet head and a position (y) of an intersection of the virtual line perpendicular to the plane (x) and the recording medium was set at 3 mm. As a recording medium, corrugated fiberboard having a thickness of about 2 mm and having a white colored layer was used. Driving conditions for the head were such that the standard voltage and standard temperature of the ink-jet head were employed, and the droplet size was set at 18 pL, and 100% solid printing was performed to obtain a printed matter.

The printed matter was scanned by a scanner, and a ratio of the portion to which the ink is not applied (streak line ratio) was calculated using an image analysis soft "Image)".

⊙: The streak line ratio of the printed matter is less than 3%.

◯: The streak line ratio of the printed matter is 3 to less than 5%.

Δ: The streak line ratio of the printed matter is 5 to less than 10%.

x: The streak line ratio of the printed matter is 10% or more.

TABLE 7

|  |  | Example 1 | Example 2 | Example 3 | Example 4 | Example 5 |
|---|---|---|---|---|---|---|
| Setting property | | ⊙ | ⊙ | ⊙ | ⊙ | ⊙ |
| Adhesion | OPP | ⊙ | ⊙ | ⊙ | ⊙ | ⊙ |
| | PET | ◯ | ◯ | ◯ | ◯ | ◯ |
| Discharge property | | ◯ | ⊙ | ⊙ | ◯ | ⊙ |
| Streak line | | ◯ | ◯ | ◯ | ◯ | ◯ |

TABLE 8

|  |  | Example 6 | Example 7 | Example 8 | Example 9 | Example 10 |
|---|---|---|---|---|---|---|
| Setting property | | ⊙ | ◯ | ⊙ | ⊙ | ⊙ |
| Adhesion | OPP | ⊙ | ◯ | ⊙ | ⊙ | ⊙ |
| | PET | ◯ | ◯ | ◯ | ◯ | ◯ |
| Discharge property | | ◯ | ◯ | ⊙ | ⊙ | ⊙ |
| Streak line | | ◯ | ◯ | ◯ | ◯ | ◯ |

TABLE 9

|  |  | Example 11 | Example 12 | Example 13 | Example 14 | Example 15 |
|---|---|---|---|---|---|---|
| Setting property | | ⊙ | ⊙ | ⊙ | ⊙ | ⊙ |
| Adhesion | OPP | ⊙ | ⊙ | ⊙ | ⊙ | ⊙ |
| | PET | ◯ | ◯ | ◯ | ◯ | ◯ |
| Discharge property | | ⊙ | ⊙ | ⊙ | ⊙ | ⊙ |
| Streak line ratio | | ⊙ | ⊙ | ⊙ | ⊙ | ⊙ |

TABLE 10

|  |  | Example 16 | Example 17 | Example 18 | Example 19 | Example 20 |
|---|---|---|---|---|---|---|
| Setting property | | ◯ | ◯ | ◯ | ◯ | ◯ |
| Adhesion | OPP | ◯ | ◯ | ◯ | ◯ | ◯ |
| | PET | ◯ | ◯ | ◯ | ◯ | ◯ |
| Discharge property | | ⊙ | ⊙ | ⊙ | ⊙ | ⊙ |
| Streak line | | ◯ | ⊙ | ⊙ | ⊙ | ⊙ |

TABLE 11

|  | Comparative Example 1 | Comparative Example 2 | Comparative Example 3 | Comparative Example 4 | Comparative Example 5 |
|---|---|---|---|---|---|
| Setting property | ○ | ○ | ○ | ○ | x |
| Adhesion OPP | x | x | ○ | ○ | x |
| PET | x | x | ○ | ○ | x |
| Discharge property | x | ○ | x | x | x |
| Streak line | Δ | Δ | x | x | Δ |

With respect to the aqueous inks in Examples 1 to 20, it was found that excellent results are obtained for both the adhesion to the OPP and PET films and the setting property. Particularly, with respect to each of the aqueous inks in Examples 2, 3, 5, and 8 to 20 which use a mixture of the binder (A) having a carbonyl group and having a Tg of 5° C. or higher and the compound (B) having a structure capable of reacting with the carbonyl group, and which use a solvent having a Hansen solubility parameter in which the polar term is 7 to 12 and the hydrogen bond term is 15 to 30, it was found that no misdirection occurs upon ink-jet and especially excellent results are obtained.

In contrast, with respect to the aqueous inks in Comparative Examples 1, 2, 4, and 5 having a formulation which does not contain a mixture of the binder (A) having a carbonyl group and the compound (B) having a structure capable of reacting with the carbonyl group, the adhesion to the OPP and PET substrates was unsatisfactory. With respect to the aqueous ink in Comparative Example 3 using a urethane resin, the adhesion to the film was excellent, but a film was likely to be formed in the nozzle portion, causing the ink-jet discharge property to be poor.

The invention claimed is:

1. A method for producing a printed matter, comprising: providing an ink comprising:
    a binder (A) of a core-shell polymer having a core portion comprising an acrylic polymer of a vinyl monomer component containing diacetone acrylamide having a carbonyl group, and a shell portion comprising an arbitrary acrylic polymer;
    adipic dihydrazide as a compound (B);
    water;
    a surfactant selected from the group consisting of anionic surfactant, nonionic surfactant, cationic surfactant, and amphoteric surfactant; and
    a solvent (C1) in which the binder (A) and the compound (B) are dissolved or dispersed, the solvent (C1) selected from the group consisting of 1,2-propanediol, 1,4-butanediol, 1,3-butanediol, 1,2-butanediol, 3-methyl-1,5-pentanediol, 2-methyl-1,3-propanediol, 3-methyl-1,3-butanediol, and 3-methyl-1,4-butanediol;
    bringing the ink in contact with a surface of a recording medium; and
    drying the ink while maintaining the surface temperature of the recording medium in a range of 5 to 60° C. such that the carbonyl group of the diacetone acrylamide in the core portion reacts with the adipic dihydrazide when the solvent (C1) volatilizes, thereby forming a structure represented by the following chemical formula (1):

2. The method according to claim 1, wherein the recording medium is a plastic film.

3. The method according to claim 1, wherein the recording medium has a water absorption of 10 g/m² or less at a contact time of 100 milliseconds for the recording medium and pure water.

4. The method according to claim 1, wherein the ink is brought in contact with the surface of the recording medium by means of an ink-jet printer.

5. The method according to claim 4, wherein the recording medium has a water absorption of 10 g/m² or less at a contact time of 100 milliseconds for the recording medium and pure water.

* * * * *